Oct. 19, 1954   W. J. READING   2,691,786
EGG WASHER
Filed Dec. 29, 1949

INVENTOR
Walter J. Reading
Bean, Brooks, Buckley & Bean
ATTORNEYS

Patented Oct. 19, 1954

2,691,786

UNITED STATES PATENT OFFICE 2,691,786

EGG WASHER

Walter J. Reading, Ottumwa, Iowa

Application December 29, 1949, Serial No. 135,640

13 Claims. (Cl. 15—3.15)

This invention relates to poultry egg cleaning apparatus, and more particularly to an improved machine for removing soil and the like from eggs as in my prior Patent Number 2,454,090.

A primary object of the invention is to provide a highly efficient and yet gentle scrubbing unit for a machine of the aforementioned class. Another object of the invention is to provide a compact and mechanically simple machine for the specified purpose, the machine being adapted to be operated economically and with improved ease and facility to provide more perfect cleaning of the treated eggs. Other more specific objects and advantages of the invention will appear from the specification herein.

Figure 1:
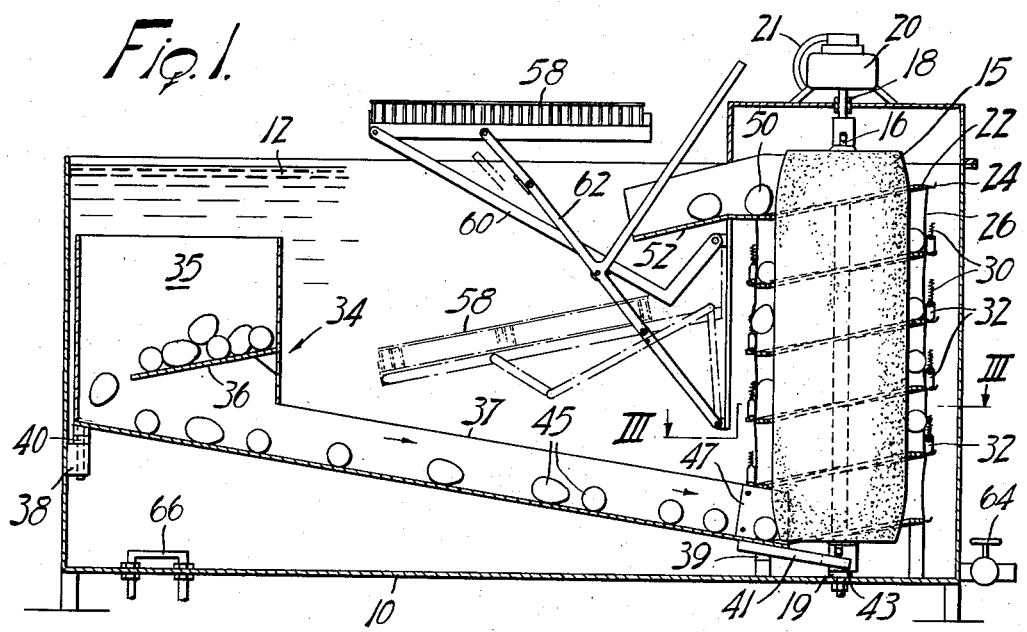
Fig. 1 is a vertical section through a machine of the invention, showing a batch of eggs in process of being cleaned.

The invention is illustrated in the drawing by way of a typical exemplification thereof to comprise a washing tank 10 of rectangular box form such as may be conveniently constructed of any suitable material to contain a supply of egg cleaning fluid up to the liquid level indicated at 12. At one end of the tank 10 and interiorly thereof is disposed a combination egg scrubbing and elevating mechanism including a cylindrical brush 15 carried by a vertical shaft 16 upon suitable bearings as at 18 and 19. Any suitable means may be employed to rotate the brush, as for example, a gear drive device 20 coupled to the brush shaft 16, the gear drive being coupled in turn to any suitable power device such as an electric motor 21.

A stationary helical ramp 22 is arranged substantially coaxially with the brush 15 so as to encircle the brush without interference with its rotation. The ramp 22 is formed with hooks 24 spaced along its outer periphery for the attachment of an apron 26 thereon. The apron 26 is adapted to form a cylindrical enclosure about the ramp 22 and may be conveniently fabricated in strip form from a rubber sheet in such fashion that it may be wound around the ramp 22 and fastened on the hooks 24 by means of a series of eyelets 28 along each edge of the strip. Coil springs 30 are hung diagonally on the hooks 24 outside of the apron, spaced at intervals therealong, preferably beginning at the end of the first half turn at the bottom of the ramp 22 and ending at the beginning of the last half turn at the top. Each spring 30 carries a short length of rubber hose 32, about one inch long, at the lower end adjacent the ramp. Finally, a lockwire 33 is wound from hook to hook outside the apron 26 and the springs 30 so as to hold them securely in place.

The apron is pliable and easily distended except at the springs, where the external bracing action of the springs resists outward movement of the apron, thereby forming resilient baffle-like constrictions in the passageway formed by the brush, the apron, and the ramp. The provision of the short lengths of hose on the springs increases this effect adjacent the ramp surface, so that the dimensioning of the hose lengths provides a means of adjustment of the baffling effect. The omission of the springs near the ends of the ramp, as for example in the top and bottom half turns is made to facilitate orderly flow of the eggs into and out of the scrubbing unit.

An egg supply device 34 consisting of hopper 35, baffle 36 and chute 37 is supported in the tank 10 upon support brackets 38 and 39 in such manner that the chute portion is inclined downwardly toward the bottom end of the brush 15. At its upper end the supply device 34 is pivotally secured by a pin 40 extending into the bracket 38, whereby the tray is angularly reciprocable. At its other end the device 34 rests slidingly upon the bracket 39 and is formed with an extending yoke 41 which is suitably apertured at 42 to journal upon an eccentric cam device 43 which is keyed to the brush shaft 16; whereby it will be understood that as the brush rotates the cam 43 will simultaneously actuate the egg supply device 34 so as to reciprocate it sideways. It will be appreciated that, where necessary as in the case of large machines, any suitable mechanism may be employed whereby both ends of the device 34 may be reciprocated. The chute 37 preferably has a tapering end where it joins the yoke and an upstanding flange 44 extends along each tapered edge, whereby the eggs are guided toward the apron and the brush and subsequently into the space therebetween.

Thus, the chute will shuffle the supply of eggs as indicated generally at 45 downwardly into consecutive feeding relation through a feeding port 46 which is defined between the bottom and upstanding flanges of the chute 37 and the lower end 47 of the apron 26. The end 47 of the apron is preferably connected to the adjacent flange of the chute. Since the brush normally rotates toward that side of the chute, the eggs will be brushed away from the other side and toward the side of the feeding port thus delineated. The egg feeding port 46 is limited vertically to such dimension as to permit only a desired rate of egg passage therethrough into the region of the lower end of the ramp device 22 and into rubbing engagement with the brush 15.

Thus, it will be understood that a supply of eggs to be cleaned may be placed in the hopper 35 in the tank 10; the tank 10 being filled to the indicated level with a supply of egg cleaning solution. The brush driving motor may then be started and the reciprocative sidewise motion of the egg supply device 34 will feed a continuous stream of eggs from the hopper 35 past the baffle 36, and down the chute 37 between the flanges 44 into the region of the lower end of the brush 15 whereby the eggs will contact the bristles of the brush and will be wiped onto the receiving end 48 of the spiral ramp 22 into scrubbing position between the brush 15 and the resilient apron 26. As the brush continues to rotate it subjects the eggs to a scrubbing action and simultaneously in conjunction with the rush of water upwardly through the cylinder pulls them around the ramp in such manner as to cause them to climb the ramp for final ejection from the upper end thereof as illustrated by the egg shown at position 50. To facilitate ejection of the scrubbed eggs from the upper end of the scrubber the upper end of the spiral ramp 22 may be formed with a radial discharge land 52, and the upper end 54 of the apron may be attached to one side flange 56 of the land.

A gathering tray is preferably employed as indicated at 58 to comprise a shallow screen or box-like member adapted to be supported within the upper portion of the tank 10 upon a tray lifting device 60 extending from the tank structure, and arranged to receive the eggs as they are discharged from the scrubbing unit. Any suitable mechanism such as the illustrated linkage 62 may be utilized to support the tray 58 and to raise it out of the washing solution for emptying or replacement with an empty tray. If desired, the machine may be made capable of continuous operation by the provision of two egg receiving trays arranged side-by-side for example with separate tray lifting devices and a suitable gate to direct the washed eggs into one or the other of the trays while the companion tray is being emptied or replaced. It will be appreciated that inasmuch as the entire egg transporting movement takes place under the upper level of the cleaning solution the eggs are semi-floating in the liquid throughout the entire cleaning process, and therefore the eggs are transported throughout the entire operation in liquid-cushioned fashion whereby possibility of egg breakage is obviated.

Figure 3:
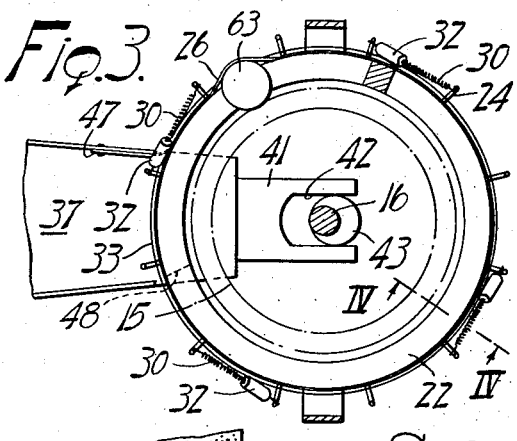
Fig. 3 is a fragmentary top section thereof, as along line III—III of Fig. 1.
Figure 4:
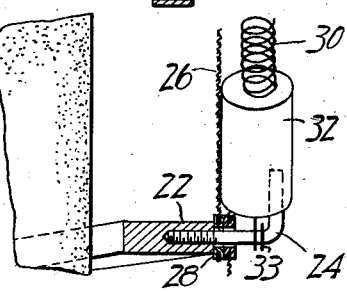
Fig. 4 is a detail sectional view taken along line IV—IV of Fig. 3.
Figure 2:
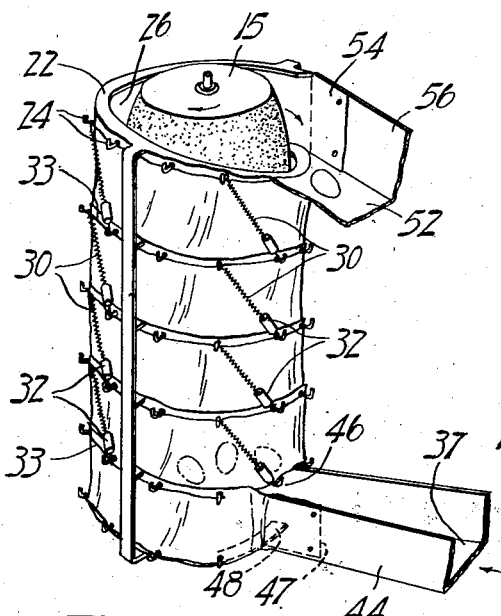
Fig. 2 is a perspective view of the scrubbing unit.

A particular feature and advantage of the egg scrubbing and elevating device of the invention results from the novel resilient wall form of the cylindrical enclosure or container surrounding the brush and elevating ramp devices. As previously stated, the cylindrical container is formed by a rubber apron fixed to the outside of the ramp with a plurality of inclined springs each of which carries a short length of hose at its lower end; the springs being spaced at intervals so as to reinforce the apron on the outside. In operation, the eggs are guided up the ramp between the brush and the apron. The eggs roll freely along the ramp in the spaces between the springs but are restrained when they pass the positions of the springs, whereby they are brushed and scrubbed as the rotating brush pushes them past each spring. The short length of hose at the lower end of each spring acts to increase the resistance to egg passage adjacent to the ramp so that the eggs are given a tumbling movement as they climb over the lump in the apron caused by the hose whereby the eggs are thoroughly scrubbed and washed on all sides. Since the springs are inclined in the direction of egg movement, the eggs do not tend to become lodged behind them, and even if one does become caught at one of the springs, the other eggs will simply climb up over the caught egg and pass above the position of the hose, where there is less resistance to passage. Since the apron is pliable, each part of the egg-washing path through the scrubber is virtually independent of every other part, so that congestion or crosswise disposition of eggs in one part of the scrubber will not substantially affect the pressure on eggs in another part, so that no egg is subjected to undue pressure and yet every egg is subjected to full and effective washing. Thus, breakage of eggs is avoided and the eggs are enabled to roll and tumble universally as they move through the scrubbing device; but the elastic container wall structure guides the eggs to generally maintain their major axes vertically, as shown at 63, Fig. 3.

It will also be appreciated that the cleaning method of the invention provides improved egg cleaning results because the eggs are initially solution-soaked while resting in the hopper 35. They are then simultaneously elevated and scrubbed by the brush 15 while being universally tumbled by reaction forces of the brush, the apron, and the springs. Ultimately the eggs are discharged to float into the receiving tray or basket 58 which is disposed in the region of the upper and relatively cleaner portion of the bath within the tank; and the cleaned eggs may be removed at will by simply lifting the basket 59 out of the tank. A sediment discharge and solution changing drain valve is disposed in the bottom of the tank as indicated at 64, and a heating device such as for example, a steam coil 66 may be provided to keep the cleaning solution at an optimum washing temperature.

Although only one form of the invention has been shown and described in detail, it will be apparent to those skilled in the art that the invention is not so limited but that various changes may be made therein without departing from the spirit of the invention or the scope of the appended claims.

I claim:

1. An egg cleaning device comprising a tank adapted to contain an egg cleaning solution, a generally cylindrical brush mounted vertically within said tank and submerged in said solution, a stationary helical ramp carried by said tank so as to encircle said brush in coaxial relation therewith, an elastic apron carried by said ramp to substantially enclose the said ramp in coaxial cylindrical relation thereto, a plurality of coil springs carried by said ramp outside said apron generally parallel to said apron and in juxtaposition with said apron and inclined relative to said ramp in the upward direction therealong, said springs being free to move laterally intermediate of their ends against the tension thereof, a short length of hose carried by each of said springs at its lower end, egg feeding means mounted in the bottom of said tank in said solution for initially wetting the eggs with the solution and for feeding them to the lower end portion of said apron and to the receiving end of said ramp, and means located within said tank at the discharge end of said ramp and submerged in said solution for discharging eggs from the top end portion of said apron into said tank.

2. An egg cleaning device comprising a tank adapted to contain an egg cleaning solution, a generally cylindrical brush mounted vertically within said tank and submerged in said solution, a stationary helical ramp mounted in said tank so as to encircle said brush in coaxial relation therewith, a pliable apron carried by said ramp to substantially enclose the said ramp in coaxial cylindrical relation thereto, a plurality of coil springs carried by said ramp outside said apron generally parallel to said apron and in juxtaposition with said apron and inclined relative to said ramp in the upward direction therealong, said springs being free to move laterally intermediate of their ends against the tension thereof, a short resilient collar carried by each of said springs at its lower end, egg feeding means mounted in said tank in said solution for initially wetting the eggs with the solution and for feeding them to the lower end portion of said apron and to the receiving end of said ramp, and means located within said tank at the discharge end of said ramp and submerged in said solution for discharging eggs from the top end portion of said apron into said tank.

3. An egg cleaning device comprising a tank adapted to contain an egg cleaning solution, a generally cylindrical brush rotatably mounted vertically within said tank and submerged in said solution, a stationary helical ramp mounted in said tank so as to encircle said brush in coaxial relation therewith, a pliable apron carried by said ramp to substantially enclose the said ramp in coaxial cylindrical relation thereto, a plurality of coil springs mounted outside said apron in supporting relation thereto and inclined relative to said ramp upwardly from the ramp surface in the direction of rotation of said brush, a resilient collar carried by each of said springs outside said apron adjacent said ramp surface, egg feeding means mounted in said tank for feeding the eggs to the receiving end of said ramp, and means at the discharge end of said ramp for discharging eggs.

4. An egg cleaning device comprising a tank adapted to contain an egg cleaning solution, a generally cylindrical brush mounted vertically within said tank and submerged in said solution, a stationary helical ramp mounted in said tank so as to encircle said brush in coaxial relation therewith, a pliable apron mounted surrounding said ramp to substantially enclose the said ramp in coaxial cylindrical relation thereto, and a plurality of elastic tension members mounted outside said apron in containing relation thereto and traversing the spaces between adjacent turns of said ramp.

5. In an egg cleaning machine, a scrubbing unit comprising a rotatable cylindrical brush, a stationary helical ramp surrounding said brush in coaxial relation thereto, a pliable sheet-form casing embracing the outer periphery of said ramp, said ramp, said brush, and said casing forming a spiral passageway for the conduction of eggs, a plurality of elastic tension members mounted outside said casing in containing relation thereto and traversing the spaces between adjacent turns of said ramp.

6. In an egg cleaning machine, a scrubbing unit comprising a rotatable cylindrical brush, a stationary helical ramp surrounding said brush in coaxial relation thereto, a pliable sheet-form casing embracing the outer periphery of said ramp, said ramp, said brush, and said casing forming a spiral passageway for the conduction of eggs, and resilient means mounted outside said casing and pressing inwardly against said casing at intervals along said passageway for intermittently restraining the free passage of eggs therethrough and for pressing said eggs against said brush as said eggs pass said resilient means.

7. In an egg cleaning machine, a scrubbing unit comprising a rotatable cylindrical brush, a stationary helical ramp surrounding said brush in coaxial relation thereto, a pliable sheet embracing the outer periphery of said ramp, said ramp, said brush, and said sheet forming a spiral passageway for the conduction of eggs, and biasing means pressing inwardly against said sheet at intervals along said passageway for restraining the free passage of eggs therethrough for pressing said eggs against said brush as said eggs pass said biasing means, said biasing means being disposed to extend between adjacent turns of said ramp.

8. In an egg cleaning machine, a scrubbing unit comprising a rotatable cylindrical brush, a stationary helical ramp surrounding said brush in coaxial relation thereto, a pliable sheet embracing the outer periphery of said ramp, said ramp, said brush, and said sheet forming a spiral passageway for the conduction of eggs, and biasing means pressing inwardly against said sheet at intervals along said passageway for restraining the free passage of eggs therethrough and for pressing said eggs against said brush as said eggs pass said biasing means, said biasing means being disposed to extend between adjacent turns of said ramp and to be inclined in the direction of the helical slope of said ramp.

9. In an egg cleaning machine, a scrubbing unit comprising a rotatable substantially vertically disposed cylindrical brush, a stationary helical ramp surrounding said brush in coaxial relation thereto, a pliable sheet embracing the outer periphery of said ramp, said ramp, said brush, and said sheet forming a spiral passageway for the conduction of eggs, and biasing means pressing inwardly against said sheet at intervals along said passageway for restraining the free passage of eggs therethrough and for pressing said eggs against said brush as said eggs pass said biasing means, said biasing means being disposed to extend between adjacent turns of said ramp and to be inclined in the direction of the helical slope of said ramp, said biasing means being adapted to press against said sheet with increased force at the region of the lower end of said extent.

10. In an egg cleaning machine; an egg conveying passageway comprising a ramp, and a movable brush means and a pliable sheet-form wall means at opposite sides of said ramp to form the opposite sides of said passageway; and egg retarding means comprising resilient means mounted outside said wall means in containing relation thereto and extending across said wall means from said ramp.

11. In an egg cleaning machine; an egg conveying passageway comprising a ramp, and a movable brush means and a pliable sheet-form wall means at opposite sides of said ramp to form the opposite sides of said passageway; and egg retarding means comprising resilient means mounted outside said wall means in containing relation thereto and extending across said wall means from said ramp and inclined in the direction of motion of said brush.

12. In an egg cleaning machine; an egg conveying passageway comprising a ramp, and a movable brush means and a pliable sheet-form wall means at opposite sides of said ramp to form the opposite sides of said passageway; and egg retarding means comprising resilient means mounted outside said wall means in containing relation thereto and extending across said wall means from said ramp and inclined in the direction of motion of said brush, said retarding means being adapted to contain said wall means with increased force adjacent said ramp.

13. In an egg cleaning machine, a scrubbing unit comprising a rotatable generally cylindrical brush, a stationary helical ramp conformably surrounding said brush in coaxial relation thereto, a pliable sheet embracing the outer periphery of said ramp, said ramp, said brush, and said sheet forming a spiral passageway for the conduction of eggs, and biasing means pressing inwardly against said sheet at intervals along said passageway for restraining the free passage of eggs therethrough and for pressing said eggs against said brush as said eggs pass said biasing means, said biasing means being disposed to extend between adjacent turns of said ramp and to be inclined from the egg guiding ramp surface in the direction of the rotation of said brush, said biasing means being adapted to press against said sheet with increased force adjacent said ramp surface.

References Cited in the file of this patent

UNITED STATES PATENTS

| Number | Name | Date |
|---|---|---|
| 1,676,306 | White | July 10, 1928 |
| 1,952,619 | Benner | Mar. 27, 1934 |
| 2,454,090 | Reading | Nov. 16, 1948 |

FOREIGN PATENTS

| Number | Country | Date |
|---|---|---|
| 71,060 | Sweden | Jan. 29, 1930 |